United States Patent
Resch et al.

(10) Patent No.: US 6,612,740 B1
(45) Date of Patent: *Sep. 2, 2003

(54) INTRAORAL DENTAL RADIOGRAPHIC FILM PACKET WITH INJECTION MOLDED COMFORT-ENHANCING EDGE BEAD

(75) Inventors: Douglas T. Resch, Rochester, NY (US); Bruce W. Konte, Pittsford, NY (US); Edgar G. Earnhart, Hilton, NY (US); Scott H. Schwallie, Rochester, NY (US); Michael R. McGovern, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,868

(22) Filed: Mar. 24, 2000

(51) Int. Cl.[7] .................................. A61B 6/14

(52) U.S. Cl. ..................................... 378/169

(58) Field of Search .................. 378/166–169, 378/173–174, 170

(56) References Cited

U.S. PATENT DOCUMENTS

| | | | |
|---|---|---|---|
| 1,537,925 A | | 5/1925 | Bolin |
| 1,631,497 A | * | 6/1927 | Marler ................. 378/169 |
| 2,084,092 A | | 6/1937 | Kenney |
| 3,198,515 A | | 8/1965 | Pitney |
| 3,443,093 A | | 5/1969 | Lindenmuth et al. |
| 3,721,472 A | | 3/1973 | Mammel |
| 4,165,132 A | | 8/1979 | Hassan et al. |
| 4,626,216 A | | 12/1986 | Strong-Grainger |
| 4,791,657 A | | 12/1988 | Kirsch et al. |
| 4,805,201 A | | 2/1989 | Strong-Grainger |
| 4,847,884 A | | 7/1989 | Dove |

(List continued on next page.)

FOREIGN PATENT DOCUMENTS

| | | |
|---|---|---|
| EP | 0564011 | 10/1993 |
| FR | 2627076 | 8/1989 |

OTHER PUBLICATIONS

U.S. patent application Ser. No. 09/534,368, Bacchetta et al., filed Mar. 24, 2000.
U.S. patent application Ser. No. 09/533,867, Bacchetta et al., filed Mar. 24, 2000.
U.S. patent application Ser. No. 09/534,372, Baccheta, et al., filed Mar. 24, 2000.
U.S. patent application Ser. No. 09/534,393, Bacchetta et al., filed Mar. 24, 2000.
U.S. patent application Ser. No. 09/534,370, Bacchetta et al., filed Mar. 24, 2000.
U.S. patent application Ser. No. 09/534,392, Earnhart et al., filed Mar. 24, 2000.
U.S. patent application Ser. No. 09/534,516, Resch et al., filed Mar. 24, 2000.

Primary Examiner—Michael J. Milano
Assistant Examiner—Victor X Nguyen
(74) Attorney, Agent, or Firm—Mark G. Bocchetti (57) ABSTRACT

An intraoral x-ray film packet is taught which has an outer envelope wherein one of the two opposing outer sheets is more rigid than the other such that it has a tensile modulus of at least about 700 Kg/cm$^2$. This is preferably accomplished by making both sheets from a thermoplastic material such as PVC and reducing the amount of plasticizer in the more rigid of the two sheets to less than 30%. A continuous perimetric seal is formed affixing the two outer sheets together and forming a perimetric laminated edge which is substantially coplanar with the more rigid of the two sheets. A film chip resides between the two outer sheets. A comfort-enhancing perimetric edge bead is injection molded directly onto the perimetric laminated edge.

18 Claims, 5 Drawing Sheets

U.S. PATENT DOCUMENTS

| | | |
|---|---|---|
| 4,852,143 A | 7/1989 | Scheier et al. |
| 4,911,871 A | 3/1990 | Liese, Jr. |
| 4,912,740 A | 3/1990 | Liese |
| 4,913,288 A | 4/1990 | Tanaka |
| 4,922,511 A | 5/1990 | Gay |
| 5,044,008 A | 8/1991 | Jackson |
| 5,077,779 A | 12/1991 | Steinhausen, Jr. |
| 5,102,118 A | 4/1992 | Vits |
| 5,170,423 A | 12/1992 | Yurosko |
| 5,209,387 A | 5/1993 | Long et al. |
| 5,285,491 A * | 2/1994 | Muylle et al. ............... 378/168 |
| 5,470,420 A | 11/1995 | Yokajty |
| 5,784,433 A | 7/1998 | Higa |
| 6,309,101 B1 * | 10/2001 | Bacchetta et al. .......... 378/168 |
| 6,312,156 B1 * | 11/2001 | Bacchetta et al. .......... 378/168 |
| 6,428,205 B1 * | 8/2002 | Bacchetta et al. .......... 378/168 |
| 6,474,864 B1 * | 11/2002 | Resch et al. ................ 378/169 |
| 6,505,965 B1 * | 1/2003 | McGovern ................... 378/169 |

* cited by examiner

INTRAORAL DENTAL RADIOGRAPHIC FILM PACKET WITH INJECTION MOLDED COMFORT-ENHANCING EDGE BEAD

FIELD OF THE INVENTION present invention relates generally to intraoral radiographic film packets with comfort enhancing features, and, in particular, to improvements to ientraoral radiographic film packets which allow for ease of manufacture and application of a comfort-enhancing perimetric edge bead.

BACKGROUND OF THE INVENTION

A common problem experienced by people visiting the dentist is the discomfort and pain associated with the taking of dental x-rays caused by the positioning of intraoral radiographic film packets in the patient's mouth. The typical intraoral radiographic film packet includes relatively hard and/or relatively sharp edges that press against and irritate the gums and other oral soft tissue of the person whose teeth are being x-rayed. A variety of intraoral x-ray dental packets are known in the prior art which include features intended to be comfort enhancing. In addition, attempts have been made to create comfort enhancing structures into which intraoral-x-ray dental packets can be inserted prior to placement in the patient's mouth. One example of this type of structure is taught in U.S. Pat. No. 5,044,008 titled "Dental Film Cartridge Cushion," by Regional B. Jackson, Aug. 27, 1991. Jackson utilizes a cartridge cushion comprising a foam sheet sandwich into which the x-ray dental packet is placed for the purpose of cushioning and increasing the comfort to the patient. Jackson requires the manual insertion of the x-ray packet into the cartridge cushion. Thus, Jackson adds significant bulk to the packet and enhances the possibility of triggering a gag reflex action in the patient. Additionally, after the cartridge cushion is removed from the packet, it would be possible to reuse the cartridge cushion which would not be sanitary.

A second example of an add-on structure is taught in U.S. Pat. No. 5,285,491 titled "Dental Film Packet," by Muylle et al., Feb. 8, 1994. Muylle et al. teaches sealing a film pack in an envelope consisting of a pair of thin pockets of injection molded plastic which are sealed with a band of adhesive tape. The envelope has no sharp edges and generally rounded corners. Thus, as with Jackson's device, this device requires manual insertion of the packet, adds significant bulk to the packet, enhances the possibility of triggering a gag reflex in the patient, and can also be reused in a non-sanitary manner.

U.S. Pat. No. 1,631,497 titled "Dental X-ray Film Package," by Harry L. Marler, Jun. 7, 1927 teaches a dental x-ray film package wherein a sensitized sheet is sandwiched between two opaque sheets. A heavy band of rubber is stretched about the periphery of the package to hold the package securely together and to provide the light-tight joint.

U.S. Pat. No. 1,537,925 titled "Dental X-ray Film Package," by Leonard M. Bolin, May 12, 1925, teaches a dental x-ray film package wherein a pair of film sheets and the cover sheet are inserted into a container. The container consists of a frame including a backing portion in an enlarged continuous beading about the periphery thereof. The beading must be forced away from the backing portion and stretched peripherally in order to insert the film sheets and cover sheet therein. The container thus serves to hold the package together and provide the light-tight seal.

U.S. Pat. No. 4,791,657 titled "Intraoral Radiographic Film Packet," by Alan Kirsch et al., Dec. 13, 1988, teaches a dental radiographic film packet which includes soft corners for greater patient comfort. The packet is constructed by removing all material from the corners of a typical dental radiographic film packet with the exception of the film chip. Individual corner covers which are seamless pockets are then added to the four corners of the packet. The corner covers create an airspace at each corner around the edge of the film chip.

U.S. Pat. No. 2,084,092 titled "Dental Film Holder," by Ralph Kenney, Jun. 15, 1937, teaches a dental film holder that is a stretchable vellum rubber plate with integral corner pockets into which an x-ray dental packet may be manually inserted. Kenney's dental film holder is intended to be reusable. The plastic envelope of an intraoral dental radiographic film packet of the type disclosed in U.S. Pat. No. 3,443,093 titled "Dental X-ray Packet Having A Uniform Overall Thickness And Method Of Making Same," by Terry N. Lindenmuth et al., May 6, 1969, is typically constructed by joining at the margin thereof two generally parallel sheets of flexible plastic material (typically flexible PVC). Two webs of plastic (which may be referred to as the base and top webs) form the envelopes of the dental film packets. The dental film, lead and opaque sheets are inserted and deposited on the base web and the top web is placed there over. The top and base webs are then sealed at the margin of each packet to form a continuous web of sealed packets. The continuous web of sealed packets is subsequently die-cut to form a plurality of individual film packets.

Any subsequent operation requiring accurate positioning of the individual film packets such as for the purpose of molding a compliant bead as disclosed in U.S. Pat. No. 4,912,740 titled "Intraoral Dental Radiographic Film Packet Improvement," by Elmer W. Liese, Jr., et al., Mar. 27, 1990, becomes very difficult due to several factors including: a) size variation resulting from the die-cutting of flexible material with residual web stress; b) deflection of the marginal area (laminated perimetric edge) of individual film packets (the marginal area does not remain planar after the die-cutting operation); c) the flexible nature of the laminated perimetric edge when placed in a positioning fixture; and d) poor encapsulation of the perimetric edge due to easy and randomized deformation of the marginal area.

From the foregoing it can be seen that many attempts to add a comfort enhancing feature to dental x-ray film packets resulted in structures requiring manual assembly and/or modification of individual film packets in order to receive comfort enhancing structure. Further, such prior art attempts, particularly those seeking to provide the comfort enhancing feature via a frame, have resulted in a significant increase in bulk thereby enhancing the possibility of inducing a gag reflex, and/or also resulted in a structure in which additional manual steps are required for assembly and/or disassembly. Also, the prior art designs fail to provide the features and operations that allow for automated, accurate positioning of individual film packets for automated application of comfort enhancing features thereto that overcome the problems of size variation resulting from the die-cutting of flexible material with residual web stress, deflection of the marginal area of individual film packets, and the flexible nature of the laminated perimetric edge when placed in a positioning fixture for application of a comfort-enhancing perimetric edge bead.

SUMMARY OF THE INVENTION

It is therefore, an object of the present invention to provide a semi-rigid envelope for an intraoral dental radiographic film packet that permits accurate positioning for the purpose of applying a comfort-enhancing bead to the perimetric edges of the marginal area, thereby reducing the cutting sensation of the packet by implying a softer, smoother, more rounded feel to the patient's gums, lips and other sensitive tissues of the oral cavity.

It is another object of the present invention to provide a dental film packet wherein the size of the packet is not affected by residual stress in the marginal area after die-cutting a continuous web of sealed dental packets into individual dental packets.

Yet another object of the present invention is to provide a dental film packet wherein the packet is easier to accurately position for the application of a comfort-enhancing edge bead.

Still another object of the present invention is to provide a dental film packet that is resistant to deformation when placed against a positioning device for the application of a comfort-enhancing edge bead.

It is a further object of the present invention to provide an intraoral radiographic film packet with a comfort enhancing perimeter.

Still another object of the present invention is to provide an intraoral radiographic film packet which has a comfort enhancing perimetric edge permanently integrated therewith during manufacture.

The foregoing and numerous other features, objects and advantages of the present invention will become readily apparent upon a review of the detailed description, claims and drawings set forth herein. These features, objects and advantages are accomplished by forming an intraoral dental film packet with an envelope comprised of two outer plastic sheets wherein preferably one of the two outer plastic sheets is a stiffening sheet. The stiffening sheet is more rigid than the typical outer sheets found on prior art dental film packets. The stiffening sheet preferably has a tensile modulus in the range of from about 700 to about 28,000 $Kg/cm^2$. The envelope is formed by joining together the two outer plastic sheets at the marginal or peripheral area to form a perimetric laminated edge that preferably has a tensile modulus in the range of from about 400 to about 28,000 $Kg/cm^2$. By making one of the outer sheets more rigid than the other, the laminated perimetric edge formed by bonding the two outer sheets together is substantially coplanar with the more rigid of the two outer sheets. This resultant rigidity of the film packet in combination with achieving a planar surface on one side of the packet enhances the ability to die cut the packet and maintain outside dimension tolerances. Further, the rigidity obviates the easy deformation of the perimetric edge during subsequent operations in the handling and positioning of individual film packets after the die-cutting operation. This, in turn, allows for more accurate positioning of individual film packets in such subsequent operations. In addition, the planarity of the laminated perimetric edge also aids in achieving full encapsulation by peripheral edge bead. After die cutting there is likely to be some limited deflection (curling) of the laminated perimetric edge away from the plane of the stiffening sheet as a result of the stress exerted by the opposite outer sheet. This limited deflection is still substantially coplanar as compared to the prior art dental film packets. As used herein, the term "substantially coplanar" means that deflection of the laminated perimetric edge away from the plane of the stiffening sheet after die cutting is no more than about 20 thousandths of an inch and preferably no more than about 10 thousandths of an inch.

In manufacturing the individual film packets of the present invention, such film packets are transported by a Bernoulli effect apparatus against hard stop reference points. The added rigidity of the laminated perimetric edge and the concomitant improved outside dimensional tolerances achieved therewith allow individual film packets to be transported by a Bernoulli effect apparatus and hard stop reference points without deformation of the laminated perimetric edge. In such manner, individual film packets can be accurately positioned for subsequent operations including acquisition by a robotic arm for insertion into an injection molding apparatus for the formation of a peripheral edge bead on the packet. The improved planarity and outer dimensional tolerances of the film packet assure not only that the film packet can be accurately positioned but also that the die-cut edge will be fully encapsulated with the application of the injection molded perimetric edge bead. The positioning of individual film packets against hard stop reference points by a Bernoulli effect apparatus results in a force being applied to the laminated perimetric edge of the film packet in a direction which is substantially parallel to the plane of the stiffening sheet. The laminated perimetric edge should have sufficient rigidity such that it will not deform when these forces are in the range of from about 5 to about 80 Millington (the level of force likely to result from using a Bernoulli effect device to position the dental packet against hard stop reference points).

DETAILED DESCRIPTION OF THE INVENTION

Figure 1:
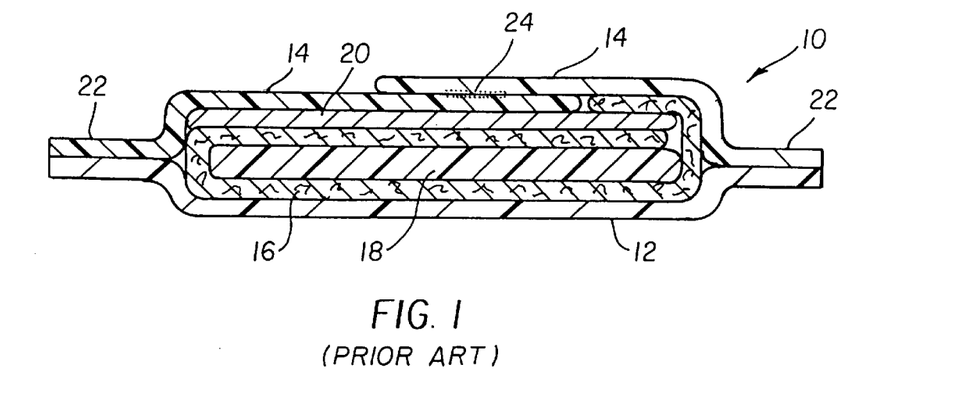
FIG. 1 is a cross-sectional view of a typical prior art dental film packet.

Turning first to FIG. 1, there is shown a cross-section of a typical prior art dental film packet 10. Dental film packet 10 includes an outer envelope comprising a vinyl sheet 12 on one face of the dental film packet 10 and a pair of overlapping vinyl sheets 14 on the opposite face thereof. Contained between the sheet 12 and overlapping sheets 14 are a paper wrap element 16, a film chip 18 and a lead foil 20. Vinyl sheets 12 and 14 project beyond dimensions of the paper wrap element 16, the film chip 18 and lead foil 20 to yield a perimetric edge 22. Laminated perimetric edge 22 allows for heat sealing of vinyl sheets 12 and 14 to one another to yield a light tight perimeter to the dental film packet 10. In addition, a heat seal 24 is generated at the overlap of vinyl sheets 14 to provide an outer envelope which is completely light tight and which is substantially watertight. This prior art dental film packet 10 therefore includes a relatively stiff and sharp perimetric edge created by the laminated perimetric edge 22. It is this relatively stiff and sharp perimetric edge which causes discomfort to the patient.

Figure 2:
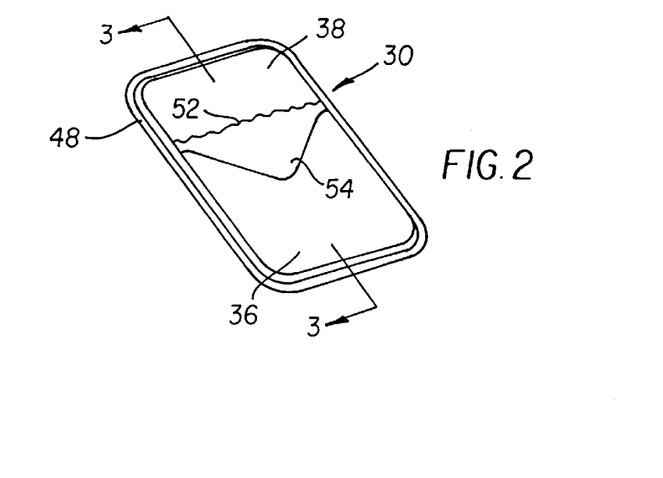
FIG. 2 is a perspective view of the improved dental film packet of the present invention prior to application of a perimetric edge bead.
Figure 3:
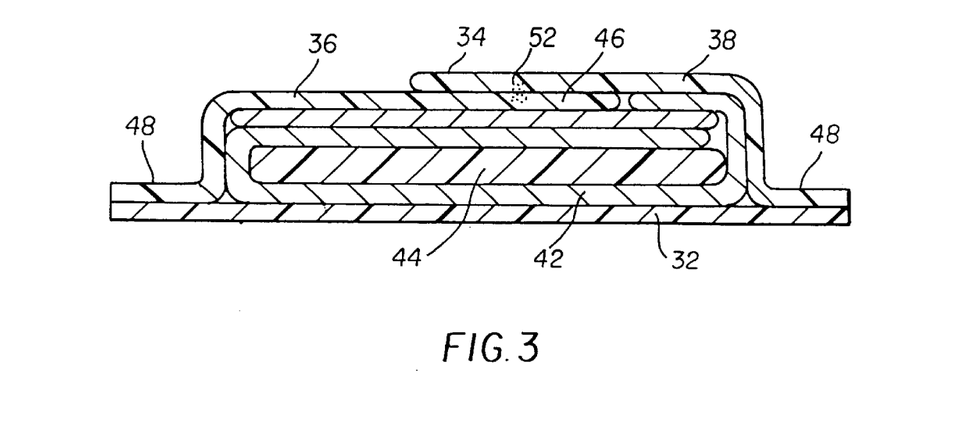
FIG. 3 is a cross-sectional taken along line 3—3 of FIG. 2.

Turning next to FIGS. 2 and 3, there is shown the dental film packet 30 of the present invention prior to the application of an injection molded perimetric edge bead. Dental film packet 30 includes an envelope comprising a first outer sheet or stiffening sheet 32 and an opposing second outer sheet 34. Second outer sheet 34 is actually comprised of a pair of overlapping sections 36 and 38. Outer sheets 32 and 34 are preferably made of a soft thermoplastic material such as, but not limited to polyvinyl chloride (PVC), ethylene vinyl acetate (EVA), or thermoplastic polyurethane (TPU), or a di-block polyamide copolymer.

Sandwiched between outer sheets 32 and 34 are the typical elements found in a dental x-ray film packet. There is a paper wrap element 42, the film chip 44 and a lead foil 46. The dental x-ray film packet 30 is assembled by placing the paper wrap element 42, the film chip 44 and a lead foil 46 between outer sheets 32 and 34 and sealing the outer sheets 32 and 34 to one another form a perimetric laminated edge 48. Perimetric laminated edge 48 can be formed by heat sealing, RF sealing, ultrasonic sealing, or any other sealing mechanism which can create a substantially airtight bond between outer sheets 32 and 34. There is also a transverse seal (indicated by line 52) affixing overlapping sections 36 and 38 together. Overlapping section 38 is preferably formed with a tab portion 54 which extends past transverse seal 52 to facilitate removal of the envelope for extraction and development of the film chip 44 after exposure.

Outer stiffening sheet 32 is preferably formed from a more rigid material than that of outer sheet 34. In this manner, the laminated perimetric edge 48 becomes substantially coplanar with outer stiffening sheet 32 as opposed to the perimetric edge of the prior art dental packet 10 shown in FIG. 1 which is positioned more toward the center of the dental packet 10. This flatter (more planar) surface aids in the accurate positioning of the packet 30 in subsequent operations. Further, the more rigid material enhances the ability to die cut the packet 30 and maintain outside dimensions within tolerances. This enhances the ability to fit and accurately place the packet 30 in subsequent operations such as, for example, placement of the packet 30 in a comfort enhancing frame or applying a comfort enhancing bead thereto. This level of accuracy within dimensional tolerances is needed for automated assembly. As long as the material is more rigid, both outer sheets 32 and 34 forming the outer envelope of the packet 30 can be made of this more rigid material to garner the same benefits of positioning and dimensional control stated above.

One way of making outer stiffening sheet 32 more rigid is by reducing the amount of plasticizer used in the thermoplastic material of outer stiffening sheet 32 such that the thermoplastic material is less than 30 percent plasticizer. For example, in the case of polyvinyl chloride (PVC), the plasticizer could be dioctyl adipate (DOA), diethyl hexyl phthalate (DEHP) or dioctyl phthalate (DOP). The effect of reducing the amount of plasticizer is to increase the stiffness or modulus of the material from which outer sheet 32 is made so that during the heat sealing operation to form the perimetric laminated edge 48, the application of heat and the effects of the heating fixture do not as readily deform the material toward the center of the thickness of the packet 30 as was typical with the prior art packet 10.

The stiffening sheet 32 preferably has a tensile modulus in the range of from about 700 to about 28,000 Kg/cm$^2$. The envelope is formed by joining together the two outer plastic sheets at the marginal or peripheral area to form a perimetric laminated edge that preferably has a tensile modulus in the range of from about 400 to about 28,000 Kg/cm$^2$, and most preferably about 15,700 Kg/cm$^2$. By way of example, if PVC is used as the material for outer sheets 32 and 34, then outer stiffening sheet 32 should have a thickness in the range of from about 0.10 to about 0.33 mm. This combination of thickness and tensile modulus will achieve the necessary rigidity for the perimetric laminated edge 48 to remain substantially coplanar with outer stiffening sheet 32. Further, this combination of thickness and tensile modulus when laminated to second outer sheet 34 results in a perimetric laminated edge 48 which will not deform under the forces applied thereto by a Bernoulli positioning apparatus, such forces preferably being in the range of from about 5 to about 80 millinewtons and which are in a direction that is substantially parallel to the plane of outer stiffening sheet 32. Again, by way of example, using an outer sheet 34 made of PVC with a nominal thickness of about 0.20 mm and with a tensile modulus of about 310 Kg/cm$^2$ in combination with an outer stiffening sheet 32 having a thickness of about 0.20 mm and a tensile modulus of about 15,700 Kg/cm$^2$ results in a perimetric laminated edge 48 with a thickness of about 0.33 mm and a tensile modulus of about 15,600 Kg/cm$^2$. This exemplary perimetric laminated edge 48 will not deform as result of a force in the range of from about 5 to about 80 millinewtons applied to the perimetric laminated edge 48 and parallel to the plane of outer stiffening sheet 32.

Figures 4, 5:
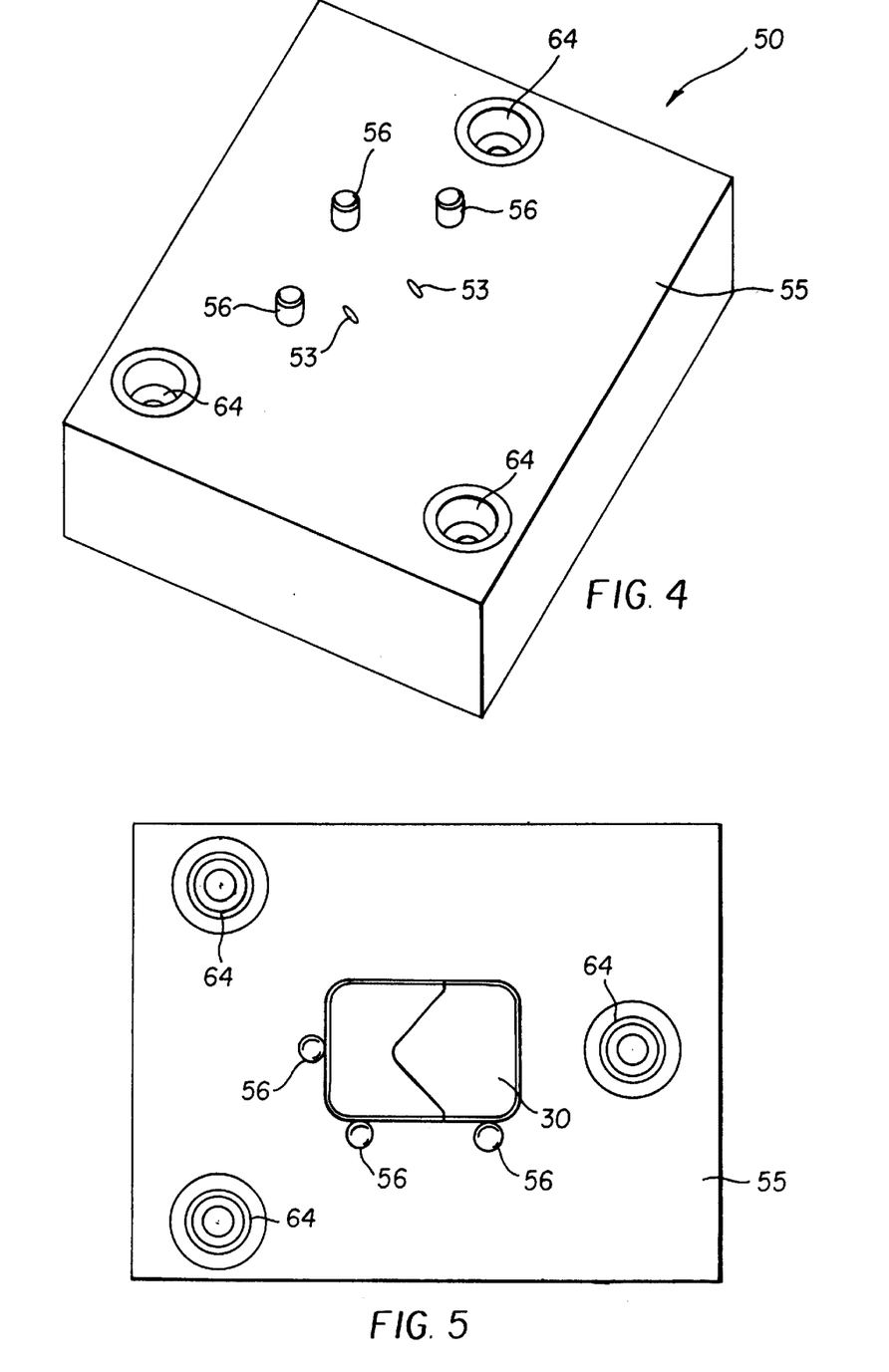
FIG. 4 is a perspective view of the Bernoulli positioning device used in the practice of the present invention.
FIG. 5 is a top plan schematic of the dental film packet of FIG. 2 residing in the Bernoulli positioning device shown in FIG. 4.

Looking next at FIG. 4, the method of the present invention takes an intraoral dental radiographic film packet 30, and delivers it to a Bernoulli fixture 50. Delivery of the intraoral dental radiographic film packet 30 to a Bernoulli fixture 50 may be accomplished in a variety of ways such as, for example, a pick-and-place type mechanism with a vacuum cup used for packet acquisition and release. Application of the Bernoulli effect is used to orient and precisely position individual dental radiographic film packets 30. Compressed air is directed through a number of low angled air holes 53 in the top surface 55 of Bernoulli fixture 50. Air holes 53 are preferably inclined at an angle in the range of from about 15° to about 30° from horizontal, and most preferably at an angle of about 25° from horizontal. The angle of inclination of air holes 53 can be shallower than 15° but machining of such shallow angled holes becomes more difficult. This creates a laminar flow of air along the surface 55. This airflow imparts a force on the dental packet 30, driving the dental packet 30 against the fixture reference features 56 which provide hard stops in two dimensions and thereby fixes the location of the dental packet 30 in a horizontal plane. Because of the airflow velocity, the pressure between the surface 55 of the Bernoulli fixture and the packet 30 is lower than the pressure on the side of the packet 30 away from the Bernoulli fixture 50. Thus the packet 30 remains attracted to the surface 55, rather than being pushed away. As mentioned above, perimetric laminated edge 48 should not deform under the forces applied thereto by the Bernoulli fixture 50, such forces preferably being in the range of from about 5 to about 80 millinewtons and in a direction that is substantially parallel to the plane of outer stiffening sheet 32. There are preferably also three locating ports 64 in top surface 55.

Figure 6:
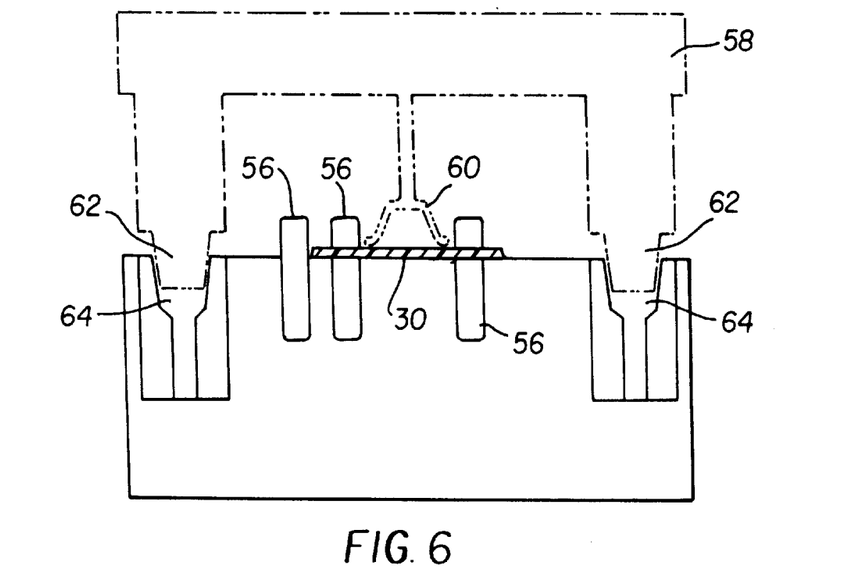
FIG. 6 is a side elevation/partial cross-sectional view of a robotic arm (in ghost) acquiring the dental film packet from the Bernoulli positioning device.

As shown schematically in FIG. 5, with the packet 30 accurately oriented in a known position against fixture reference features 56, packet 30 can be picked up by a robotic arm 58 having a vacuum cup 60 disposed on the end thereof (see FIG. 6). The robotic arm 58 may include locating pins 62 adapted to engage locating ports 64 in Bernoulli fixture 50 to ensure repeatable and precise acquisition of dental packets 30. Locating pins 62 engaging with locating ports 64 is just one method of ensuring repeatable and precise acquisition of dental packets 30. Other methods for repeatable and precise acquisition by a robotic arm are well known to those skilled in the art.

Figure 7:
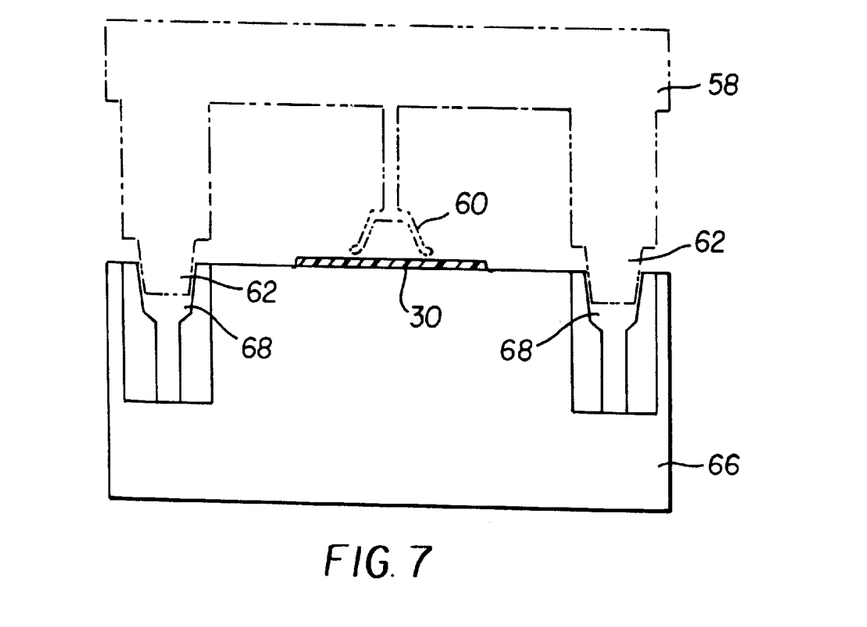
FIG. 7 is a side elevation/partial cross-sectional view of a robotic arm placing the dental film packet into an injection mold base.
Figures 8, 9, 10:
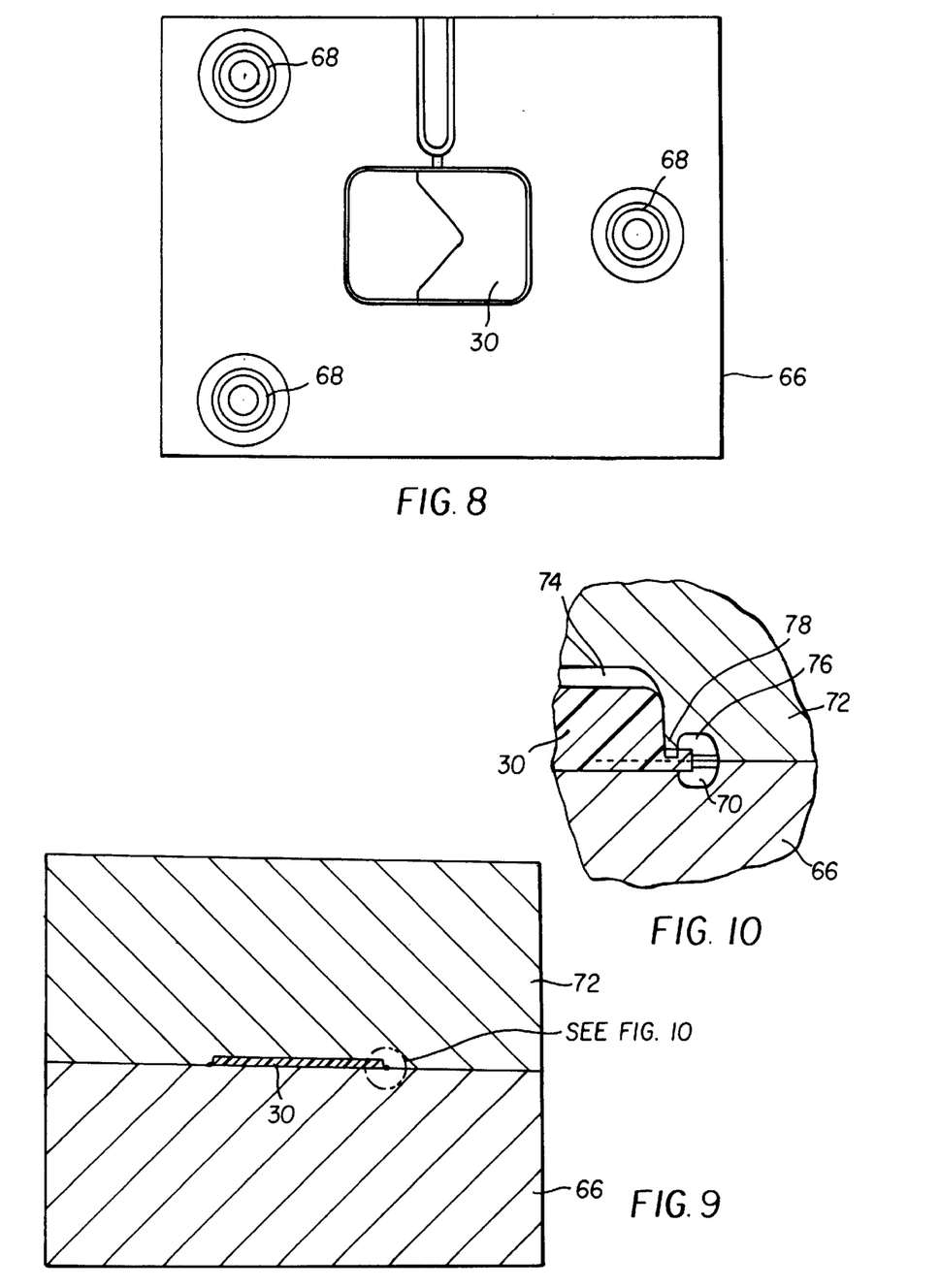
FIG. 8 is a top plan view of the dental film packet residing in the injection mold base.
FIG. 9 is a cross-sectional view of the dental film packet residing between the mold base and upper mold half.
FIG. 10 is an enlarged view of the area within circle A of FIG. 9.
Figure 11:
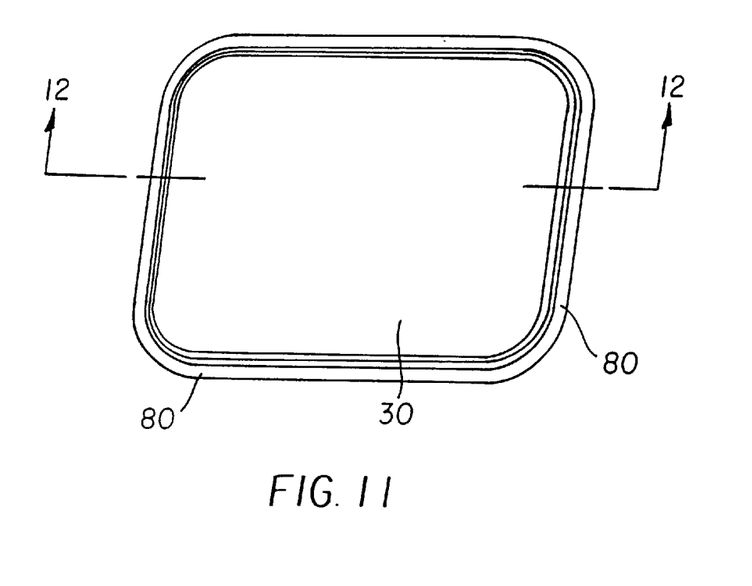
FIG. 11 is a perspective view of the dental film packet shown in FIG. 2 with a comfort enhancing perimetric edge bead molded thereto.
Figure 12:
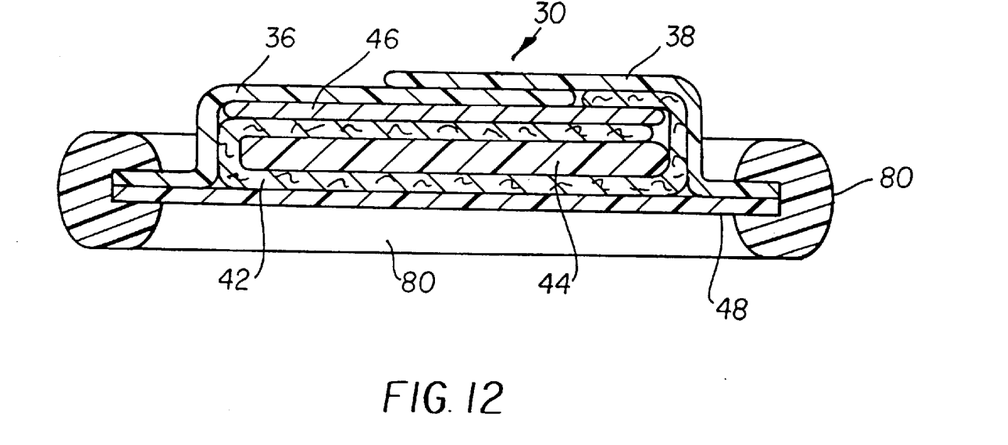
FIG. 12 is a cross-sectional view taken along line 12—12 of FIG. 11.

Once a dental film packet 30 has been acquired by vacuum cup 60 disposed on the end of robotic arm 58, the robotic arm 58 delivers the dental film packet 30 to an injection mold base 66 (see FIG. 7). Injection mold base 66 includes locating ports 68 which, in conjunction with locating pins 62, ensure repeatable and precise placement of dental packets 30 into injection mold base 66 with reference to a lower bead canal 70 in the surface of injection mold base 66. With the dental film packet 30 so placed, vacuum pressure to vacuum cup 60 is discontinued and the robotic arm 58 leaves the dental film packet 30 on the injection mold base 66 as shown in FIG. 8. An upper mold portion 72 is then placed in abutting position with injection mold base 66 as depicted in FIG. 9. Upper mold portion 72 includes a packet cavity 74 in which a dental packet 30 resides (see FIG. 10), and an upper bead canal 76. Packet cavity 74 and upper bead canal 76 are separated by a continuous lip element 78. With injection mold base 66 and upper mold portion 72 residing in abutting position, perimetric laminated edge 48 extends into the mold cavity formed by lower bead canal 70 and upper bead canal 76. A comfort-enhancing perimetric edge bead 80 (see FIGS. 11 and 12) can then be formed on perimetric laminated edge 48 by injection molding of a thermoplastic material into the mold cavity formed by lower bead canal 70 and upper bead canal 76. The perimetric edge bead 80 is comprised of a generally compliant material and is of a generally rounded cross-section so as to reduce the cutting sensation of the packet 30 by implying a softer, smoother, more rounded feel to the patient's gums, lips and inside of the oral cavity. A soft thermoplastic material such as but not limited to polyvinyl chloride (PVC) is preferably used for perimetric edge bead 80. The thermoplastic material preferably has a relatively low durometer material (e.g. 50 to 90 Shore A) to enhance the soft feeling. Other materials that can be used for injection molding of perimetric edge bead 80 include, for example, thermoplastic elastomers and di-block polyamide copolymers.

It should be clear to those skilled in the art that the ability to accurately position a packet 30 in a Bernoulli fixture 50 by driving it against hard stop reference features 56 is affected by the flexibility of the marginal area (perimetric laminated edge 48). The added rigidity of outer sheet 32 should be great enough to resist deformation under the forces applied by the Bernoulli fixture 50. In addition, the added rigidity and planarity of marginal area (perimetric laminated edge 48) ensures residence in the mold cavity formed by lower bead canal 70 and upper bead canal 76. This, in turn, ensures encapsulation of the die-cut perimetric edge of the packet 30 which allows for the application of the comfort-enhancing perimetric edge bead 80 which encapsulates at least part of the sharp edges of the die-cut perimetric edge of the perimetric laminated edge 48.

Although stiffening sheet 32 has been described herein as being an outer sheet it should be apparent to those skilled in the art that an extra or third sheet could be applied outside the stiffening sheet 32. This extra or third sheet would however add to expense and bulk of each packet 30. Thus for the purposes of this application the term "outer sheet" includes an envelope forming sheet in which the paper wrap element 42, the film chip 44 and a lead foil 46 reside and which forms at least in part the laminated perimetric edge 48.

From the foregoing, it will be seen that this invention is one well adapted to obtain all of the ends and objects herein above set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

| PARTS LIST: | |
|---|---|
| 10 | dental film packet (prior art) |
| 12 | outer envelope comprising a vinyl sheet |
| 14 | outer envelope comprising overlapping vinyl sheets |
| 16 | paper wrap element |
| 18 | film chip |
| 20 | lead foil |
| 22 | laminated perimetric edge |
| 24 | heat seal |
| 30 | dental film packet (present invention) |
| 32 | first outer sheet or stiffening sheet |
| 34 | opposing second outer sheet |
| 36 | overlapping sections |
| 38 | overlapping sections |
| 42 | paper wrap element |
| 44 | film chip |
| 46 | lead foil |
| 48 | laminated perimetric edge |
| 50 | Bernoulli fixture |
| 52 | transverse seal |
| 53 | low angled air holes |
| 54 | tab portion |
| 55 | top surface |
| 56 | fixture reference features |
| 58 | robotic arm |
| 60 | vacuum cup |
| 62 | locating pins |
| 64 | locating ports |
| 66 | injection mold base |
| 68 | locating ports |
| 70 | lower bead canal |
| 72 | upper mold portion |
| 74 | packet cavity |
| 76 | upper bead canal |
| 78 | continuous lip element |
| 80 | perimetric edge bead |

What is claimed is:

1. An intraoral x-ray film packet comprising:
    (a) an envelope including two outer sheets and a laminated perimetric edge, a first one of said outer sheets having a tensile modulus of at least about 700 Kg/cm$^2$ and being more rigid than the other of said outer sheets, said perimetric laminated edge being substantially coplanar with the first one of said outer sheets;
    (b) a film chip contained within said outer envelope; and
    (c) a perimetric edge bead injection molded directly onto said laminated perimetric edge.

2. An intraoral x-ray film packet comprising:
    (a) a first outer sheet having a tensile modulus of at least about 700 Kg/cm$^2$;
    (b) a second outer sheet;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet; and
    (e) a perimetric edge bead injection molded directly onto said laminated perimetric edge.

3. An intraoral x-ray film packet as recited in claim 2 wherein:
    said first outer sheet has a tensile modulus in the range of from about 700 Kg/cm$^2$ to about 28,000 Kg/cm$^2$.

4. An intraoral x-ray film packet as recited in claim 2 wherein:
    said perimetric laminated edge will not deform when subjected to a force of not more than about 80 millinewtons in a direction which is substantially parallel to the plane in which said first outer sheet resides.

5. An intraoral x-ray film packet as recited in claim 2 wherein:
    said perimetric laminated edge will not deform when subjected to a force of at least about 5 millinewtons and not more than about 80 millinewtons in a direction which is substantially parallel to the plane in which said first outer sheet resides.

6. An intraoral x-ray film packet as recited in claim 2 wherein:
    said perimetric laminated edge has a tensile modulus in the range of from about 400 to about 28,000 Kg/cm$^2$.

7. An intraoral x-ray film packet comprising:
    (a) a first outer sheet having a tensile modulus of at least about 700 Kg/cm$^2$;
    (b) a second outer sheet, wherein said second outer sheet comprises a pair of overlapping sections;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet; and
    (e) a perimetric edge bead injection molded directly onto said laminated perimetric edge.

8. An intraoral x-ray film packet as recited in claim 7 wherein:
    said second outer sheet further comprises a transverse seal affixing said pair of overlapping sections.

9. An intraoral x-ray film packet as recited in claim 8 wherein:
    one of said pair of overlapping sections includes a tab portion to facilitate removal of said first and second outer sheets.

10. An intraoral x-ray film packet comprising:
    (a) a first outer sheet having a tensile modulus of at least about 700 Kg/cm$^2$;
    (b) a second outer sheet, said first and second outer sheets being made from a thermoplastic material;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet; and
    (e) a perimetric edge bead injection molded directly onto said laminated perimetric edge.

11. An intraoral x-ray film packet comprising:
    (a) a first outer sheet having a tensile modulus of at least about 700 Kg/cm$^2$;
    (b) a second outer sheet;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet, said perimetric seal being formed by RF sealing; and
    (e) a perimetric edge bead injection molded directly onto said laminated perimetric edge.

12. An intraoral x-ray film packet comprising:
    (a) a first outer sheet having a tensile modulus of at least about 700 Kg/cm$^2$;
    (b) a second outer sheet;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet, said perimetric seal being formed by heat sealing; and
    (e) a perimetric edge bead injection molded directly onto said laminated perimetric edge.

13. An intraoral x-ray film packet as recited in claim 8 wherein:
    said transverse seal is formed by RF sealing.

14. An intraoral x-ray film packet as recited in claim 8 wherein:
    said transverse seal is formed by heat sealing.

15. An intraoral x-ray film packet as recited in claim 10 wherein:
    said first outer sheet is made more rigid than said second outer sheet by reducing the amount of plasticizer in said thermoplastic material.

16. An intraoral x-ray film packet as recited in claim 10 wherein:

said thermoplastic material of said first outer sheet includes less than 30% plasticizer.

17. An intraoral x-ray film packet as recited in claim 16 wherein:

said second outer sheet contains more than 30% plasticizer.

18. An intraoral x-ray film packet comprising:

(a) a stiffening sheet having a tensile modulus of at least about 700 Kg/cm$^2$;

(b) a second sheet;

(c) a film chip residing between said stiffening sheet and said second sheet;

(d) a perimetric seal affixing said stiffening sheet and said second sheet and forming a perimetric laminated edge, said perimetric laminated edge being substantially coplanar with said stiffening sheet; and (e) a perimetric edge bead injection molded directly onto said laminated perimetric edge.

* * * * *